(12) United States Patent
Shinozaki et al.

(10) Patent No.: US 9,075,470 B2
(45) Date of Patent: Jul. 7, 2015

(54) ELECTRONIC INFORMATION DEVICE

(75) Inventors: Takayuki Shinozaki, Kanagawa (JP);
Makoto Tomizu, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 127 days.

(21) Appl. No.: 13/876,464

(22) PCT Filed: Sep. 28, 2011

(86) PCT No.: PCT/JP2011/005476
§ 371 (c)(1),
(2), (4) Date: Mar. 27, 2013

(87) PCT Pub. No.: WO2012/042874
PCT Pub. Date: Apr. 5, 2012

(65) Prior Publication Data
US 2013/0181932 A1    Jul. 18, 2013

(30) Foreign Application Priority Data

Sep. 28, 2010    (JP) .................. 2010-217472

(51) Int. Cl.
*G06F 3/041* (2006.01)
*G06F 3/01* (2006.01)
*G06F 3/0484* (2013.01)
*G06F 3/0488* (2013.01)

(52) U.S. Cl.
CPC .............. *G06F 3/0412* (2013.01); *G06F 3/016* (2013.01); *G06F 3/04842* (2013.01); *G06F 3/04883* (2013.01); *G06F 3/04886* (2013.01)

(58) Field of Classification Search
CPC ... G06F 3/016; G06F 3/0412; G06F 3/04842; G06F 3/0488; G06F 3/04883; G06F 3/04886

USPC ........................................ 345/173; 379/93.19
See application file for complete search history.

(56) References Cited

U.S. PATENT DOCUMENTS

| 7,203,455 | B2 * | 4/2007 | Ernst et al. ..................... 434/317 |
| 7,555,728 | B2 | 6/2009 | Esaki et al. |
| 2002/0030667 | A1 * | 3/2002 | Hinckley et al. .............. 345/173 |
| 2003/0043174 | A1 * | 3/2003 | Hinckley et al. .............. 345/684 |

(Continued)

FOREIGN PATENT DOCUMENTS

| JP | S63-263522 A | 10/1988 |
| JP | H04-1277314 A | 4/1992 |

(Continued)

OTHER PUBLICATIONS

International Search Report; PCT/JP2011/005476; Dec. 20, 2011.

(Continued)

*Primary Examiner* — Tom Sheng
(74) *Attorney, Agent, or Firm* — Studebaker & Brackett PC (57) ABSTRACT

An electronic information device that does not start an operation unintended by an operator when a display of an object is changed while a contact to a touch sensor is detected, is provided.

An electronic information device 1 includes a touch sensor 11, a display unit 14 configured to display the object, and a control unit 15 configured to, when deleting the object while the touch sensor 11 is detecting a contact at a position corresponding to a predetermined object area displayed on the display unit 14, control to disregard detection of the contact by the touch sensor 11 after deletion of the object until the contact is released.

4 Claims, 6 Drawing Sheets

(56) References Cited

U.S. PATENT DOCUMENTS

| | | | |
|---|---|---|---|
| 2004/0140984 A1* | 7/2004 | Hinckley et al. | 345/684 |
| 2004/0141009 A1* | 7/2004 | Hinckley et al. | 345/786 |
| 2004/0150630 A1* | 8/2004 | Hinckley et al. | 345/173 |
| 2006/0038796 A1* | 2/2006 | Hinckley et al. | 345/173 |
| 2006/0107235 A1 | 5/2006 | Esaki et al. | |
| 2006/0274046 A1* | 12/2006 | Hillis et al. | 345/173 |
| 2007/0222769 A1* | 9/2007 | Otsuka et al. | 345/173 |
| 2007/0277124 A1* | 11/2007 | Shin et al. | 715/863 |
| 2007/0277125 A1* | 11/2007 | Shin et al. | 715/863 |
| 2011/0298722 A1* | 12/2011 | Tse et al. | 345/173 |

FOREIGN PATENT DOCUMENTS

| | | | |
|---|---|---|---|
| JP | 06-035606 A | 2/1994 | |
| JP | H07-82419 B2 | 9/1995 | |
| JP | 2003-058041 A | 2/2003 | |
| JP | 2006-146516 A | 6/2006 | |

OTHER PUBLICATIONS

Japanese Office Action; Notification of Reason for Refusal; JP2012-536209; Nov. 13, 2012.

Japanese Office Action; Notification of Reason for Refusal; JP2012-536209; Sep. 18, 2012.

An Office Action;"Interrogation," issued by the Japanese Patent Office on Jul. 30, 2013, which corresponds to Japanese Patent Application No. 2012-536209 and is related to U.S. Appl. No. 13/876,464; with Concise Explanation.

* cited by examiner

ELECTRONIC INFORMATION DEVICE

CROSS REFERENCE TO RELATED APPLICATION

This application claims priority to and the benefit of Japanese Patent Application No. 2010-217472 filed on Sep. 28, 2010, the entire contents of which are incorporated herein by reference.

TECHNICAL FIELD

The embodiment discussed herein relates to an electronic information device having a touch sensor.

BACKGROUND

In recent years, electronic information devices having touch sensors such as touch panels, touch switches and the like as members for detecting a contact by an operator have been popularly used for mobile terminals such as mobile phones. Such electronic information devices having the touch sensors have been widely employed by, besides the mobile terminals, information equipments such as calculators, ticket vending machines, home electric appliances such as microwaves, TV sets, lighting equipments, industrial equipments (FA equipments) and the like.

There are known a variety of types of those touch sensors, such as a resistive film type, a capacitive type, an optical type and the like. The touch sensor of any of these types detects a contact by an operator's finger, a stylus pen and the like. Generally, the electronic information device having the touch sensor displays an image of an operation key or a button (hereinafter, referred to as an "object") in a display panel displayed on a display unit disposed on a rear face of the touch sensor. When the operator contacts the object displayed in the display panel, the touch sensor detects the contact at a position corresponding to the object.

Such an electronic information device having the touch panel, according to application software (hereinafter, referred to simply as "application") being used, may configure various user interfaces by displaying the objects. The electronic information device having the touch sensor, therefore, may configure various user interfaces with great flexibility. Also, offering simple operations and good usability for the operator, the electronic information device having the touch panel has been rapidly spread.

Incidentally, recent electronic information devices often have a function (or a part of the function) approximately the same as that of operating system (OS) incorporated into a personal computer (PC). Accordingly, when such an electronic information device is employed as the user interface of a small terminal such as the mobile phone used by the operator for inputting a character string and the like, the electronic information device operates based on an operation approximately the same as that of the personal computer (PC).

In using the small mobile terminal such as the mobile phone, for example, although a different input method is employed due to the fewer number of keys and buttons that may be arranged on a body of the small mobile terminal, the operator may move a cursor by using direction keys and press each of the keys to display a character at a predetermined position, or delete the character by using a delete key. That is, the operator who understands basic operations of the OS of the PC may often intuitively figure out basic operations of the electronic information device as well.

Also, there is an input mode of the electronic information device that performs auto repeat in response to holding down of the key. For example, when the electronic information device executes an auto repeat function, a first character is immediately displayed when the operator presses down a predetermined character key. Then, when the operator keeps pressing the same key, the same character is continuously displayed one after another. Such an "auto repeat" is also referred to as key repeat and represents a function to continuously input a plurality of the same characters, instead of a single character, when the same key is continuously pressed down for a predetermined period or longer. It is to be noted that the "holding down" is an operation to maintain pressing the same key down for the predetermined period or longer.

As a technology associated with the auto repeat, there is suggested a method that notifies the operator of progress of processing based on an operation by the operator, by means of other than a visual notification (for example, see Patent Document 1 listed below). A computer disclosed in Patent Document 1 may notify the operator that the auto repeat function is activated based on holding down of a key of a keyboard by means of a display or sound. Adoption of such a technique enables the operator, even when the display of the display unit (display screen) may not be visually observed, to know progress of processing after the operation by the operator by means of the sound.

RELATED DOCUMENT

Patent Document 1: Japanese Patent Laid-Open No. 2003-58041

SUMMARY

The auto repeat generally offers an effect similar to repetitious key pressing, which is a troublesome operation, by maintaining pressing the key down. However, in using the auto repeat function incorporated in the electronic information device having the touch sensor described above, there may be unfavorable cases. The following describes anticipated cases with reference to figures.

Figure 6:
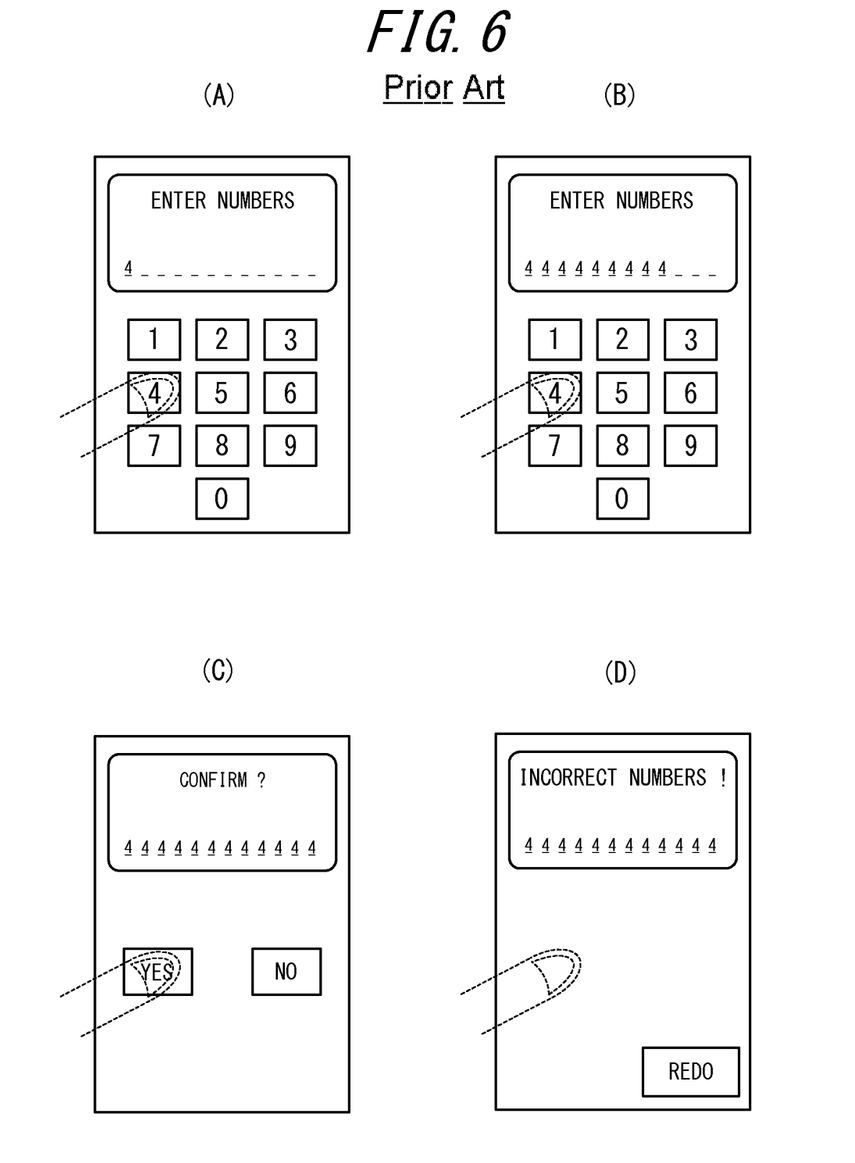

FIG. 6 is a diagram illustrating an example of the operation of the auto repeat function by a mobile terminal having the touch sensor. Here, a case in which the operator inputs predetermined 12 digits such as a PIN number, for example, constituted by the number "4" as all of first ten numbers followed by two other numbers will be described. It is assumed that, in inputting, the operator feels troublesome to repetitiously contact the same numeric key "4" and intends to perform the auto repeat by maintaining contact to the numeric key "4" halfway through and then to release the contact. Note that, in FIG. 6, the operator's finger is indicated by broken lines for facilitating visualization of the display on the display unit of the mobile terminal.

In FIG. 6(A), the mobile terminal displays an object of a numerical keypad on the display unit and detects a contact by the operator to the touch face of the touch sensor corresponding to a position of the object. This mobile terminal detects the contact by the operation to (the object of) the numerical keypad and displays a number corresponding to the key in a window in an upper portion of the display unit. For example, when the operator momentarily contacts (performs so-called "short pressing" to) the touch face of the touch sensor corresponding to a position of the numeric key "4" displayed on the display unit, the mobile terminal displays one number "4".

Following a state illustrated in FIG. 6(A), when the operator performs the "holding down" by maintaining the contact to the touch face of the touch sensor corresponding to the position of the numeric key "4" displayed on the display unit for a predetermined period or longer, the mobile terminal starts the auto repeat and displays a next number "4" on the display unit. During the auto repeat, each time when the predetermined period has passed while the contact to the touch face of the touch sensor is maintained, the mobile terminal continuously displays the number "4" on the display unit. FIG. 6(B) illustrates a state in which, as a result of continuous display of the number "4" on the display unit every time the predetermined period has passed while the contact is maintained, a total of nine "4" numbers are displayed on the display unit of the mobile terminal.

Here, when the operator fails to release the contact to the touch sensor at an appropriate timing and all of the 12 digit numbers are filled by the auto repeat, the mobile terminal may proceed to a next operation. Some applications of the mobile terminal, as illustrated in FIG. 6(C), for example, may display a panel to ask whether the numbers may be confirmed as all the necessary digits are input. When a panel displayed on the display unit is changed to another as described above, arrangement of the objects or the like is generally changed based on a configuration of the panel displayed after the change. Usually, it is likely that a configuration of the objects displayed on the display unit is changed as triggered by an event.

However, when the arrangement of the objects is changed because of the change of the panel displayed on the display unit while the contact by the operator to the touch sensor is still maintained, the contact may correspond to a position of an object displayed after the change of the arrangement. FIG. 6(C) illustrates a state in which, since the operator maintains the contact to the touch sensor when the arrangement of the objects displayed in FIG. 6(B) is changed, the operator's finger inadvertently contacts a position displaying an object of a "Yes" button after the change of the panel.

In this case, although the operator unintentionally contacts the position displaying the object of the "Yes" button, the mobile terminal starts an operation based on the contact. FIG. 6(D) illustrates a state in which, in response to an input of incorrect numbers, a notification of incorrect input is displayed. That is, since the operator does not release the contact at an appropriate timing around a point illustrated in FIG. 6(B), the display unit of the mobile terminal, at the moment when the display is changed to a confirmation panel illustrated in FIG. 6(C), changes to the panel illustrated in FIG. 6(D) against an operator's intention. When such an operation is irreversible once being processed, like an operation to send email, it may possibly cause an unfavorable result.

The example illustrated in FIG. 6 is a case in which, due to internal processing of the application requiring an input of numbers, the operator's contact causes the operation unintended by the operator. However, there are other cases that cause similar cases due to external processing interrupting an activated application.

Figure 7:
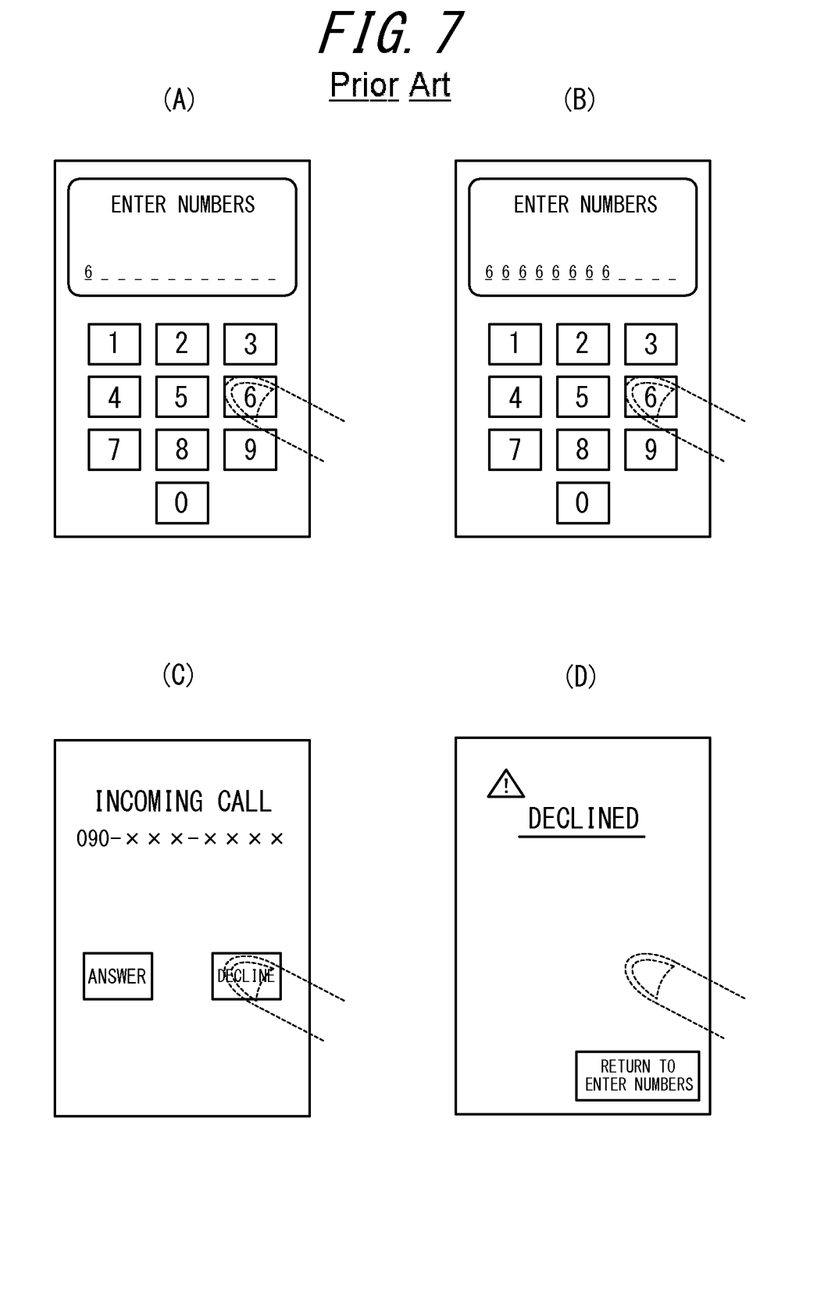

FIG. 7, in a manner similar to FIG. 6, illustrates an example when numbers are input by the operator using the auto repeat function. As illustrated in FIG. 7(A), when the operator momentarily contacts (performs the so-called "short pressing" to) the touch face of the touch sensor corresponding to a position of a numeric key "6" displayed on the display unit, the mobile terminal displays one number "6".

Following a state illustrated in FIG. 7(A), when the operator performs the "holding down" by maintaining the contact to the touch face of the touch sensor corresponding to the position of the numeric key "6" displayed on the display unit for the predetermined period or longer, the mobile terminal starts the auto repeat and displays a next number "6" on the display unit. FIG. 7(B) illustrates a state in which, as a result of continuous display of the number "6" on the display unit every time the predetermined period has passed while the contact is maintained, a total of eight "6" numbers are displayed on the display unit of the mobile terminal.

During the auto repeat, each time when the predetermined period has passed while the contact to the touch face of the touch sensor is maintained, the mobile terminal continuously displays the number "6" on the display unit. However, when the mobile terminal has a telephone function, for example, the mobile terminal may receive an incoming call during the auto repeat. In such a case, the mobile terminal may usually display a panel as illustrated in FIG. 7(C) notifying that there is the incoming call, based on an operation defined by an application associated with a phone call.

In this case also, however, since the contact to the touch sensor is maintained by the operator when the arrangement of the objects are changed due to the change of the panel displayed on the display unit, the contact corresponds to an object displayed after the change of the arrangement. FIG. 7(C) illustrates a state in which, since the operator maintains the contact to the touch sensor after the change of the arrangement of the object illustrated in FIG. 7(B), the operator's finger contacts a position displaying an object of a "Decline" button.

In this case, although the operator inadvertently contacts the position displaying the object of the "Decline" button, the mobile terminal starts an operation to decline the incoming call based on detection of the contact. FIG. 7(D) illustrates a state in which the operation starts and the incoming call is declined. That is, since the operator, at the point when the panel in FIG. 7(B) is displayed, is maintaining the contact to perform the input by the auto repeat, the contact is detected against the operator's intention when the display changes to the panel notifying the incoming call illustrated in FIG. 7(C), and thus the display changes to the panel illustrated in FIG. 7(D). When the operator wishes to answer the incoming call, such an operation is significantly inconvenient.

As described above, the change of the arrangement of the object while the contact to the touch sensor is detected may be a cause of an operation unintended by the operator. Such a situation, as described above, may be caused by regardless of the internal operation of the application or the external operation interrupting the application being activated.

Accordingly, in consideration of such conditions, an electronic information device, that does not start an operation unintended by the operator, when the display of the object is changed while the contact to the touch sensor is detected, is provided.

In order to achieve the above matter, an electronic information device according to a first aspect includes:

a touch sensor;

a display unit configured to display an object; and a control unit, when deleting the object while the touch sensor is detecting a contact at a position corresponding to a predetermined object area displayed on the display unit, configured to control to disregard detection of the contact by the touch sensor after deletion of the object until the contact is released.

A second aspect is the electronic information device according to the first aspect, wherein the control unit, when deleting the object while the touch sensor is detecting the contact at the position corresponding to the predetermined object area displayed on the display unit for a predetermined period or longer, controls to disregard detection of the contact by the touch sensor after deletion of the object until the contact is released.

A third aspect is the electronic information device according to the first aspect, further comprising a tactile sensation providing unit configured to vibrate a touch face of the touch sensor, wherein the control unit, when starting control to disregard detection of the contact, controls the tactile sensation providing unit such that a tactile sensation is provided to a contact object contacting the touch face.

A fourth aspect is the electronic information device according to the first aspect, further comprising a tactile sensation providing unit configured to vibrate the touch face of the touch sensor, wherein the control unit controls the tactile sensation providing unit, while the touch sensor is detecting the contact at the position corresponding to the predetermined object area displayed on the display unit, such that the tactile sensation is provided to a contact object contacting the touch face, and controls to stop provision of the tactile sensation when starting control to disregard detection of the contact.

According to the embodiment discussed herein, when a display of the object is changed while the contact to the touch sensor is detected, start of an operation unintended by an operator is prevented.

BRIEF DESCRIPTION OF DRAWINGS

FIG. 4(A) to (D) are diagrams illustrating an example of the operation of the electronic information device according to the embodiment;

FIG. 5(A) to (D) are diagrams illustrating another example of the operation of the electronic information device according to the embodiment;

FIG. 6(A) to (D) are diagrams illustrating an example of an operation of a related electronic information device; and FIG. 7(A) to (D) are diagrams illustrating another example of the operation of a related electronic information device.

DESCRIPTION OF EMBODIMENT

An embodiment will be described with reference to the accompanying drawings.

Figure 1:
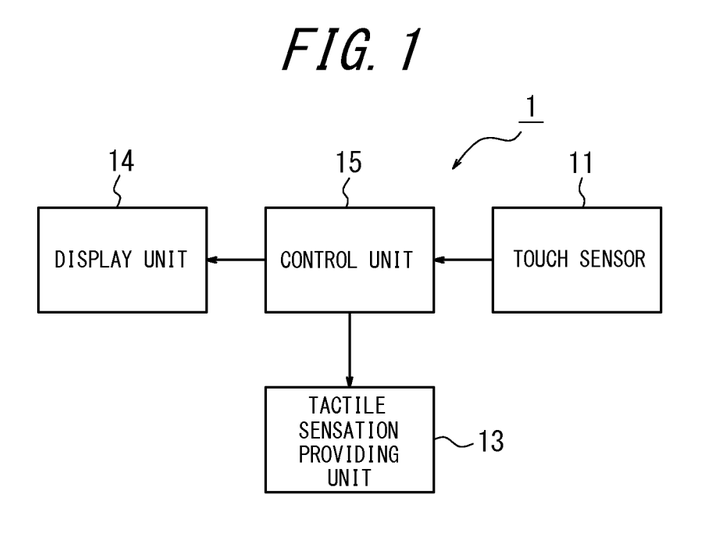
FIG. 1 is a block diagram illustrating a schematic configuration of an electronic information device according to an embodiment.

FIG. 1 is a block diagram illustrating a schematic configuration of an electronic information device according to an embodiment. As illustrated in FIG. 1, an electronic information device 1 according to the present embodiment includes a touch sensor 11, a tactile sensation providing unit 13, a display unit 14, and a control unit 15 configured to control overall operations.

The touch sensor 11 is usually disposed in front of the display unit 14 and detects a contact to objects of keys and buttons displayed on the display unit 14 by an operator's finger or the like at a corresponding position on a touch face of the touch sensor 11. The touch sensor 11 may be, for example, a resistive film type, a capacitive type, an optical type or the like. The tactile sensation providing unit 13 vibrates the touch sensor 11 and may be constituted by using, for example, a piezoelectric vibrator. The display unit 14 displays an object of the key such as a push-button switch (push-type button switch) and may be constituted by using, for example, a liquid crystal display panel, an organic EL display panel or the like.

Figure 2:
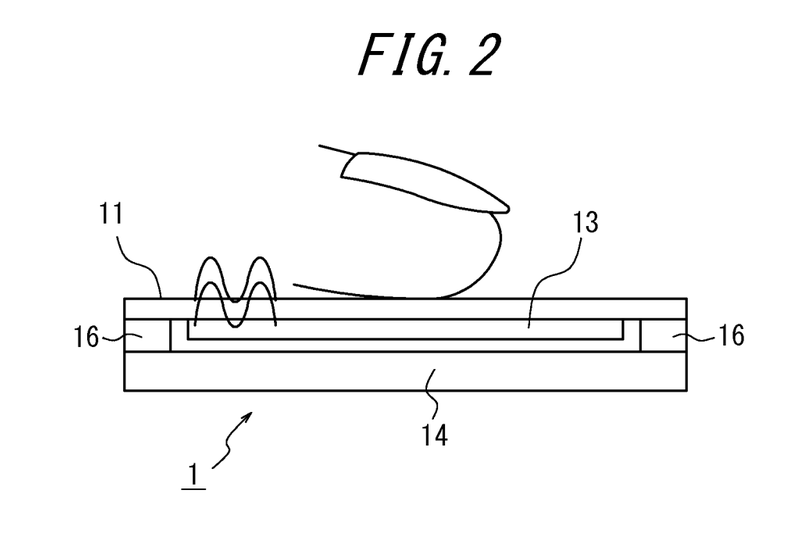
FIG. 2 is a diagram illustrating an example of a partial housing structure of the electronic information device according to the embodiment.

FIG. 2 is a cross-sectional view illustrating an example of a housing structure of the touch sensor 11, the tactile sensation providing unit 13 and the display unit 14 of the electronic information device 1 illustrated in FIG. 1.

FIG. 2 illustrates a state in which, in order to contact an area of the object such as the button displayed on the display unit 14, the operator's finger contacts the touch sensor 11 at a position corresponding to the area displaying the object on the display unit 14. The touch sensor 11, by detecting the contact by the operator's finger, outputs a signal corresponding to the position of the contact. The touch sensor 11 illustrated in FIG. 2 has the touch face having a front face member constituted by using a transparent film or the glass and a rear face member constituted by using the glass or acryl. The touch sensor 11 is held on the display unit 14 via insulators 16 made of elastic members. The tactile sensation providing unit 13 vibrates the touch face of the touch sensor 11 at an appropriate timing to provide vibration at the operator's finger. To that end, the tactile sensation providing unit 13 is disposed in contact with the touch sensor 11, for example, such that the vibration is transmitted to the touch sensor 11. The vibration generated by the tactile sensation providing unit 13 is controlled by the control unit 20 based on various conditions. The control performed by the control unit 20 such that the tactile sensation providing unit 13 provides a tactile sensation will be described below.

Figure 3:
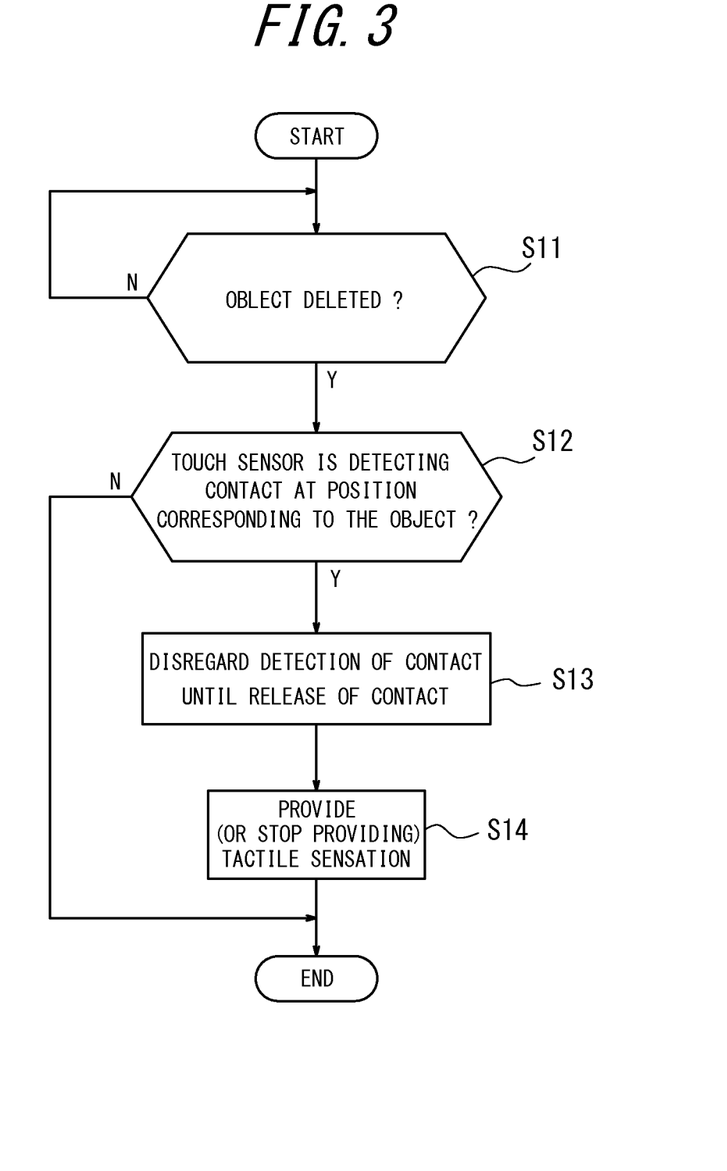
FIG. 3 is a flowchart illustrating an operation of the electronic information device according to the embodiment.

FIG. 3 is a flowchart illustrating the operation of the electronic information device 1 according to the present embodiment. The electronic information apparatus 1 according to the present embodiment, when a contact to the touch sensor 11 is detected and a displayed object corresponding to the position is deleted, operates considering that the contact is released. The flowchart in FIG. 3 illustrates an operation of the embodiment, which is performed separately from operations normally performed in character input and the like, that is, operations for displaying a character assigned to the object corresponding to the position where the contact is detected. As a preferable example of the present embodiment, a case in which, while the auto repeat is performed by the electronic information device 1 having the touch sensor in response to a "holding down" contact by the operator, a configuration of the object displayed on the display unit 14 is changed due to an event, will be described.

When the operation according to the present embodiment illustrated in FIG. 3 starts, as described above, the control unit 15 controls, as a presupposed operation, such that the display unit 14 preliminarily displays the object of the keys or the buttons. According to the present embodiment, the object is a graphic image indicating a position where the operator should contact. While such an object is displayed, the control unit 15 monitors contact by a contact object (contact means) such as the finger or a stylus pen to the touch sensor 11. When the touch sensor 11 detects a contact by such a contact object and the contact is located at the position corresponding to the object displayed on the display unit 14, the control unit 15 performs an operation defined by an activated application. For example, when the electronic information device 1 is performing an operation based on an application for inputting a character and a contact is detected at a position corresponding to an object of a numerical key, the control unit 15 displays a number assigned to the object where the contact is detected on the display unit 14.

The operation illustrated in FIG. 3 is started while the presupposed operation described above is performed. When the operation according to the present embodiment illustrated in FIG. 3 is started, the control unit 15 monitors whether there is an object displayed on the display unit 14 that is deleted due to an event or the like (step S11). Since the control unit 15 also controls the display of the image on the display unit 14, the control unit 15 may know a display state of the display unit 14.

At step S11, when the control unit 15 detects that there is an object that has been displayed on the display unit 14 but is deleted, the control unit 15 determines whether the contact is detected by the touch sensor 11 corresponding to the position where the object was displayed (step S12). When it is detected that there is a deleted object and a contact to the touch sensor 11 corresponding to the position where the object was displayed is not detected, the control unit 15 ends the operation illustrated in FIG. 3 without performing the unique operation according to the present embodiment. That is, when the object displayed on the display unit 14 is deleted due to an event or the like and the contact to the touch sensor 11 corresponding to the position where the deleted object was displayed is not detected, the unique operation according to the present embodiment is not performed.

At step S12, when the contact to the touch sensor 11 corresponding to the position where the deleted object was displayed on the display unit 14 is detected, the control unit 15 controls to disregard the detection of the contact by the touch sensor 11 after deletion of the object until the contact is released (step S13). At step S13, that is, when the contact at the position of the deleted object is still detected, until the contact is released, the operation is performed disregarding the contact detected by the touch sensor 11 (disables the detection).

This operation may take various modes for preventing from performing an operation based on the contact such as, for example, suspension of the signal from the touch sensor 11 by the control unit 15, processing of the signal from the touch sensor 11 into a signal indicating release of the contact, generation of a pseudo signal indicating release of the contact, and the like. Accordingly, "the operation is performed disregarding the detected contact" according to the present embodiment may include various operations such as temporal blocking of the signal from the touch sensor 11 as described above, processing of the signal from the touch sensor 11 into the signal indicating release of the contact, generation of the pseudo signal indicating release of the contact, and the like. As described above, when the object is deleted while the touch sensor 11 is detecting the contact at the position corresponding to a predetermined object area displayed on the display unit 14, the control unit 15 controls such that the operation is performed disregarding the contact after deletion of the object. After start of the operation disregarding detection of the contact by the touch sensor 11 (disabling the detection), when the contact to the touch sensor 11 is released, the control unit 15 controls to end the operation disregarding detection of the contact by the touch sensor 11 (that is, enables detection again). That is, when the object is deleted while the contact at the position corresponding to the predetermined object area displayed on the display unit 14 is detected by the touch sensor 11, the control unit 15 controls to disregard the contact detected by the touch sensor 11 after deletion of the object until the contact is released.

Also according to the present embodiment, the auto repeat is performed in response to the "holding down" contact by the operator to the touch sensor 11, the configuration of the object displayed on the display unit 14 is changed. Accordingly, when the control unit 15 deletes the object while the touch sensor 14 is detecting the contact at the position corresponding to the predetermined object area displayed on the display unit 14 for a predetermined period or longer, the control unit 15 preferably controls to disregard the contact detected by the touch sensor after deletion of the object until the contact is released.

After the operation at step S13, the control unit 15 drives the tactile sensation providing unit 13 with a predetermined drive signal such that the touch sensor 11 is vibrated in a predetermined vibration pattern and provides a tactile sensation (step S14).

According to the present embodiment, various tactile sensations may be assumed. For example, when the tactile sensation is not provided in response to the auto repeat before the operation at step S13, any tactile sensation is preferably provided to notify the user that the arrangement of the object on the display unit 14 is changed and the operation at step S13 has been performed. In this case, accordingly, the tactile sensation is provided at step S14. That is, the control unit 15, when starting the control to disregard the detected contact (step S13), controls the tactile sensation providing unit 13 such that the tactile sensation is provided to the contact object contacting the touch face of the touch sensor 11.

On the other hand, there may be a case in which, before the operation at step S13, the tactile sensation is provided in response to the auto repeat. That is, when a character is displayed one after another by the auto repeat, there may be a case in which it is preferable to notify the operator that the character is appropriately displayed one after another based on the "holding down" contact to the touch sensor 11 by the operator. For example, while the auto repeat is performed, together with display of the character on the display unit 14, a tactile sensation of short vibration may be provided.

In such a case, accordingly, the tactile sensation being provided based on the auto repeat is stopped at step S14. That is, the control unit 15, while the touch sensor 11 is detecting the contact at the position corresponding to the predetermined object area displayed on the display unit 14, controls the tactile sensation providing unit 13 such that the tactile sensation is provided to the contact object contacting the touch face of the touch sensor 11. Also, in controlling the tactile sensation providing unit 13 in such a manner, the control unit 15 controls to stop provision of the tactile sensation when starting controlling to disregard the detected contact (step S13).

The operation according to the present embodiment described above will be described in detail with reference to FIG. 4 and FIG. 5. In order to clarify an effect of the operation according to the present embodiment, similar cases described with reference to FIG. 6 and FIG. 7 will be assumed in the description.

Figure 4:
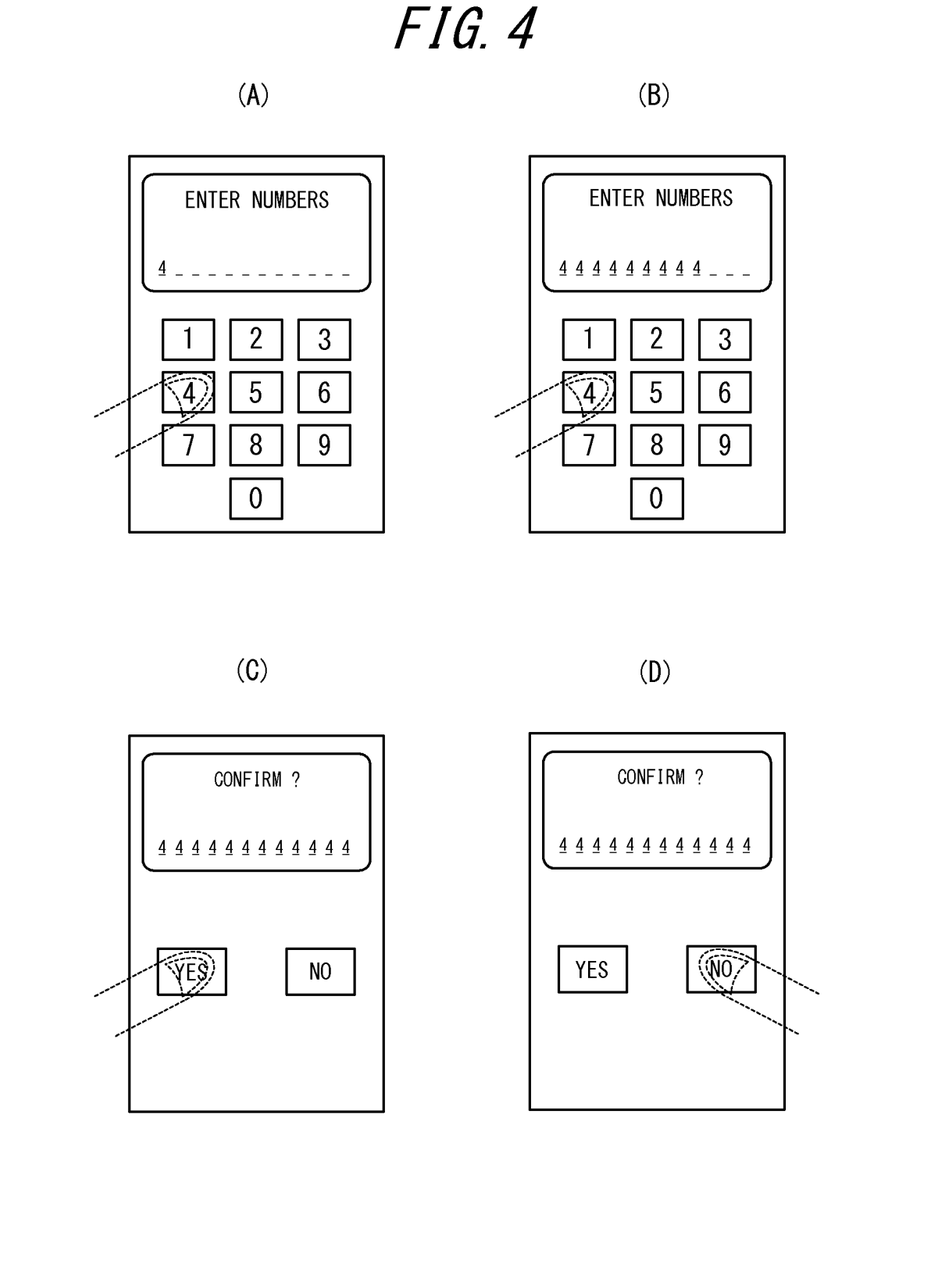

FIG. 4 assumes a situation similar to that described above with reference to FIG. 6. FIG. 4(A) illustrates a state in which the operator starts contacting the touch sensor 11 at a position corresponding to an object area of a numeric key "4" displayed on the display unit 14. Following the state illustrated in FIG. 4(A), when the operator "holds down" by maintaining the contact to the touch sensor 11 at the position corresponding to the object area of the numeric key "4" for the predetermined period or longer, the electronic information device 1 starts the auto repeat and displays a next number "4" on the display unit 14. FIG. 4(B) illustrates a state in which, since the number "4" is continuously displayed every time the predetermined period has passed while the contact is maintained, the display unit 14 of the electronic information device 1 displays a total of nine "4" numbers.

Here, since the operator does not release the contact to the touch sensor 11 at an appropriate timing and thus all the necessary 12 digits are filled by the auto repeat, the electronic information device 1 shifts to an operation to display the confirmation panel as illustrated in FIG. 4(C). However, when the electronic information device 1 shifts to the panel in FIG. 4(C) and the object of the numeric key "4", where the contact has been detected, is deleted, the electronic information device operates to disregard the contact to the touch sensor 11. Accordingly, when the touch sensor 11 detects the contact at the position corresponding to a "Yes" object area newly displayed in the panel in FIG. 4(C), the electronic information device 1 performs the operation disregarding the detection. Therefore, the electronic information device 1 does not immediately confirm the input numbers, thereby preventing the situation described with reference to FIG. 6(D).

In the state illustrated in FIG. 4(C), although the operator maintains the contact at the position corresponding to the "Yes" object area, the operator may know that the display of the object being contacted has been changed, based on whether the tactile sensation is provided. That is, when the tactile sensation is provided while the number is displayed one after another by the auto repeat around a point illustrated in FIG. 4(B), for example, provision of the tactile sensation is stopped at a point illustrated in FIG. 4(C). Thereby, the operator may know that the display of the panel has been changed. On the other hand, when the tactile sensation is not provided while the number is displayed one after another by the auto repeat around the point illustrated in FIG. 4(B), the tactile sensation is provided at the point illustrated in FIG. 4(C). Thereby, the operator may know that the display of the panel has been changed.

According to the present embodiment, as illustrated in FIG. 4(C), when the contact is maintained after deletion of the contacted object, the electronic information device 1 does not detect the contact as contact to a newly displayed object. Accordingly, the displayed numbers are not confirmed at the point illustrated in FIG. 4(C) and the operator may continue another operation thereafter as illustrated in FIG. 4(D). FIG. 4(D) illustrates a state in which, since the operator has performed an erroneous input of the number, the operator is contacting a "NO" object to prevent confirmation of the displayed number. According to the present embodiment, as described above, after release of the contact to the touch sensor 11, the electronic information device 1 enables detection of the contact by the touch sensor 11 again. Therefore, the operator may perform following operations in a normal manner.

Figure 5:
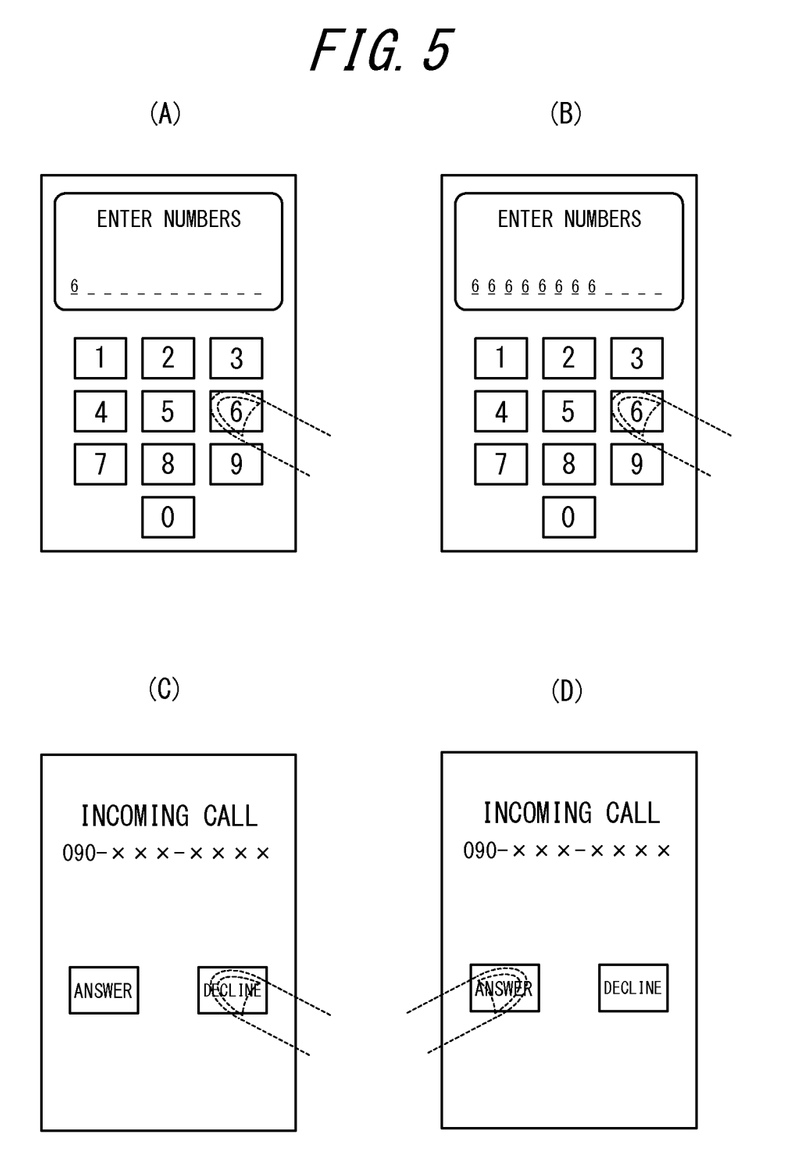

FIG. 5 assumes a situation similar to that described above with reference to FIG. 7. FIG. 5(A) illustrates a state in which the operator starts contacting the touch sensor 11 at the position corresponding to an object area of a numeric key "6" displayed on the display unit 14. Following the state illustrated in FIG. 5(A), when the operator performs the "holding down" by maintaining the contact to the touch sensor 11 at the position corresponding to the object area of the numeric key "6" for the predetermined period or longer, the electronic information device 1 starts the auto repeat and displays a next number "6" on the display unit 14. FIG. 5(B) illustrates a state in which, since the number "6" is continuously displayed every time the predetermined period has passed while the contact is maintained, the display unit 14 of the electronic information device 1 displays a total of eight "6" numbers.

Here, since there is an incoming call while the number is continuously displayed by the auto repeat, the electronic information device 1, as illustrated in FIG. 5(C), changes the display to a panel indicating the incoming call. Therefore, the operator's finger that has been contacting the touch sensor 11 at the position corresponding to the "6" object area, after the change of the display, contacts the touch sensor 11 at a position corresponding to an area of an object "Decline".

When the display shifts to the panel illustrated in FIG. 5(C) and the object of the numeric key "6", where the contact has been detected, is deleted, the electronic information device 1 operates to disregard the contact to the touch sensor 11. Accordingly, when the touch sensor 11 detects the contact at the position corresponding to the object "Decline" newly displayed as illustrated in the panel in FIG. 5(C), the electronic information device 1 operates disregarding the detection of the contact. Accordingly, the electronic information device 1 does not operate to decline the incoming call against the operator's intention, thereby preventing the situation described with reference to FIG. 7(D).

In the state illustrated in FIG. 5(C), although the operator maintains the contact at the position corresponding to the area of the object "Decline", the operator may know that the display of the object has been changed, based on whether the tactile sensation is provided. That is, when the tactile sensation is provided while the number is continuously displayed by the auto repeat around a point illustrated in FIG. 5(B), for example, provision of the tactile sensation is stopped at a point illustrated in FIG. 5(C). Thereby, the operator may know that the display of the panel has been changed. On the other hand, when the tactile sensation is not provided while the number is continuously displayed by the auto repeat around the point illustrated in FIG. 5(B), the tactile sensation is provided at the point illustrated in FIG. 5(C). Thereby, the operator may know that the display of the panel has been changed. Note that, in both cases, a tactile sensation indicating the incoming call different from other tactile sensations may be provided when the incoming call is received, thereby further improving convenience.

According to the present embodiment, as illustrated in FIG. 5(C), when the contact is maintained after deletion of the contacted object, the electronic information device 1 does not detect the contact as contact to the newly displayed object. At the point illustrated in FIG. 5(C), accordingly, the incoming call is not declined against the operator's intention and thus the operator may continue another operation thereafter as illustrated in FIG. 5(D). FIG. 5(D) illustrates a state in which the operator, as noticing the incoming call, is about to contact an object "Answer" to answer the incoming call. According to the present embodiment, as described above, after the contact to the touch sensor 11 is released, the electronic information device 1 enables detection of the contact by the touch sensor 11 again. Thereby, the operator may perform following operations in a normal manner.

According to the present embodiment, as described above, when the object is deleted while the touch sensor 11 is detecting the contact at the position corresponding to the area of the predetermined object displayed on the display unit 14, the operation is performed considering that the contact is released. According to the present embodiment, therefore, when the display of the object is changed while the contact to the touch sensor 11 is detected, start of operations unintended by the operator may be prevented.

It is to be understood that the present embodiment is not limited to the above embodiment but may be modified or varied in multiple manners. For example, although there is no mention about whether to generate sound when the electronic information device 1 performs the operation in the above embodiment, appropriate generation of sound in conjunction with the operation of the electronic information device 1 in the above embodiment may further improve operability of the electronic information device 1. In this case, the electronic information device 1 includes an audio output unit such as a speaker, which is controlled by the control unit 15 to output the sound at a predetermined timing.

Moreover, according to the embodiment described above, instead of, or together with, providing or stopping the tactile sensation described at step S14 in FIG. 3, the control unit 15 may control the audio output unit to output the sound.

Further, the tactile sensation providing unit 13 may be constituted by using any number of piezoelectric vibrators, transparent piezoelectric elements provided on an entire surface of the touch sensor or, when capable of vibrating to provide the tactile sensation, an eccentric motor which rotates by one rotation in 1 cycle of a drive signal.

According to the above embodiment, the auto repeat is performed based on the holding down "for the predetermined period or longer". According to the present embodiment, however, the operation performed based on the "holding down" is not limited to the auto repeat but may be adopted for performing other operations performed based on the "holding down", such as a key-locking operation and a key-unlocking operation in response to the "holding down".

According to the electronic information device 1 of the present embodiment described above, also, the touch sensor 11 is disposed on the front face of the display unit 14. However, configurations of the touch sensor 11 and the display unit 14 are not limited to those according to the embodiment described above. For example, the touch sensor 11 such as a touch pad may be disposed separately from the display unit 14 (that is, disposed without overlapping with the display unit 14), such that a position corresponding to a contact by the operator detected by the touch pad is indicated by a pointer or a cursor on the display unit 14.

Also, although the electronic information device according to the present embodiment described above includes the touch sensor, the display unit, the tactile sensation providing unit and the control unit, the present embodiment is not limited to such a configuration. For example, the electronic information device according to the present embodiment may further include a load detection unit constituted by using a piezoelectric element or a gauge sensor that detects a pressure load (outputs (generates) a voltage based on the pressure load) on the touch sensor. When the load detection unit is provided as described above, the "contact" according to the present embodiment includes a contact applying a pressure load (pressure) satisfying a predetermined standard load (standard voltage). In the above embodiment, when the contact at the position corresponding to the object of the numeric key is detected by the touch sensor, the control unit displays the number assigned to the object, where the contact is detected, on the display unit. On the other hand, in a case that the electronic information device includes the load detection unit, the control unit, when the contact at the position corresponding to the object of the numeric key is detected by the touch sensor and, simultaneously, the pressure load detected by the load detection unit (voltage output by the load detection unit) satisfies the predetermined standard load (an output standard), displays the number assigned to the object, where the contact is detected, on the display unit.

Also, when the electronic information device includes the load detection unit, "release of the contact" according to the present embodiment may include the pressure load of the contact that reduces and fails to satisfy the predetermined standard load. In such a case, according to the present embodiment described above, when the control unit deletes the object while the contact is detected at the position corresponding to the predetermined object area such as the numeric key displayed on the display unit, the control unit operates disregarding the detection of the contact by the touch sensor after deletion of the object until the contact is released. When the electronic information device includes the load detection unit and the control unit deletes the object while the contact is detected at the position corresponding to the predetermined object area such as the numeric key displayed on the display unit, the control unit operates disregarding the detection of the contact by the touch sensor after deletion of the object until the pressure load detected by the load detection unit fails to satisfy the predetermined standard.

Here, when the electronic information device includes the load detection unit, "operating disregarding the detection of the contact by the touch sensor" may include various operations of the control unit such as temporarily blocking a signal from the load detection unit, processing the signal from the load detection unit into a signal indicating that the pressure load fails to satisfy the predetermined standard load, or operating to generate a pseudo signal indicating that the pressure load fails to satisfy the predetermined standard load. Here, when the electronic information device includes the load detection unit, "operating disregarding the detection of the contact" by the touch sensor described above may include various operations for preventing from performing operations based on the contact. In such a case, for example, the control unit may temporarily block the signal from the load detection unit, process the signal from the load detection unit into the signal indicating that the pressure load fails to satisfy the predetermined standard load, or generate the pseudo signal indicating that the pressure load fails to satisfy the predetermined standard load.

Also, there may be a variety of modes for determining that the pressure load detected by the load detection unit satisfies the predetermined standard load. For example, by using the predetermined standard load as a predetermined threshold, it may be determined that the predetermined standard load is satisfied when a pressure load value detected by the load detection unit exceeds the predetermined threshold, when the pressure load value detected by the load detection unit becomes equal to or larger than the predetermined standard load, or when the load detection unit detects the pressure load value equal to the predetermined threshold.

Similarly, there may be a variety of modes for determining that the pressure load detected by the load detection unit does not satisfy the predetermined standard load. For example, by using the predetermined standard load as the predetermined threshold, it may be determined that the predetermined standard load is not satisfied when the pressure load value detected by the load detection unit falls under the predetermined threshold, when the pressure load value detected by the load detection unit becomes equal to or smaller than the predetermined standard load, or when the load detection unit detects the pressure load value equal to the predetermined threshold. Further, when the pressure load detected by the load detection unit fails to satisfy the predetermined standard after satisfying it, the pressure load may be determined as not satisfying the predetermined standard load.

REFERENCE SIGNS LIST 1 electronic information device
11 touch sensor
13 tactile sensation providing unit
14 display unit
15 control unit
16 insulator

The invention claimed is:

1. An electronic information device comprising:
   a touch sensor;
   a display unit configured to display an object; and
   a control unit, when deleting the object while the touch sensor is detecting a contact at a position corresponding to a predetermined object area displayed on the display unit, configured to control to disregard detection of the contact by the touch sensor after deletion of the object until the contact is released.

2. The electronic information device according to claim 1, wherein the control unit, when deleting the object while the touch sensor is detecting the contact at the position corresponding to the predetermined object area displayed on the display unit for a predetermined period or longer, controls to disregard detection of the contact by the touch sensor after deletion of the object until the contact is released.

3. The electronic information device according to claim 1, further comprising a tactile sensation providing unit configured to vibrate a touch face of the touch sensor, wherein
   the control unit, when starting control to disregard detection of the contact, controls the tactile sensation providing unit such that a tactile sensation is provided to a contact object contacting the touch face.

4. The electronic information device according to claim 1, further comprising a tactile sensation providing unit configured to vibrate the touch face of the touch sensor, wherein
   the control unit controls the tactile sensation providing unit, while the touch sensor is detecting the contact at the position corresponding to the predetermined object area displayed on the display unit, such that the tactile sensation is provided to a contact object contacting the touch face, and controls to stop provision of the tactile sensation when starting control to disregard detection of the contact.

* * * * *